United States Patent [19]

Dolan

[11] Patent Number: 4,892,162
[45] Date of Patent: Jan. 9, 1990

[54] MAILING MACHINE

[75] Inventor: Donald T. Dolan, Ridgefield, Conn.

[73] Assignee: Pitney Bowes Inc., Stamford, Conn.

[21] Appl. No.: 321,043

[22] Filed: Mar. 9, 1989

Related U.S. Application Data

[62] Division of Ser. No. 134,136, Dec. 17, 1987.

[51] Int. Cl.⁴ .................... G01G 23/22; G01G 19/00
[52] U.S. Cl. .................... 177/25.15; 177/145
[58] Field of Search ............. 177/25.15, 145, 262

[56] References Cited

U.S. PATENT DOCUMENTS

| 3,960,227 | 6/1976 | Zucker et al. | 177/262 X |
| 4,185,709 | 1/1980 | Irvine | 177/145 |
| 4,516,209 | 5/1985 | Scribner | 177/25.15 X |

Primary Examiner—George H. Miller, Jr.
Attorney, Agent, or Firm—Charles G. Parks, Jr.; David E. Pitchenik; Melvin J. Scolnick

[57] ABSTRACT

The input station of a mailing machine includes an inclined tray for feeding vertically extending mail pieces. The thickness of the mail pieces is sensed, and a separator is responsive to sensed thickness to control the feed of the lowest mail piece on the tray to a weighing device. The mail pieces are transported vertically upwardly from the weighing device, to an upper roll, with the bottoms of the mail pieces being carried over the roll to start their descent to an output stacker. A postage meter may be provided at the weighing station, or adjacent the top roll. A flap moistener may be provided upstream of the top roll, and the flaps may be sealed adjacent the top roll.

15 Claims, 4 Drawing Sheets

MAILING MACHINE

This invention relates to improvements in mailing machines of the type having a first transport arrangement for directing mail pieces from an input station to a weighing station, a second transport arrangement for directing the mail pieces from the weighing station to an output stacker, and a postage meter responsive to the weighing station for printing indicia on the mail pieces at a position intermediate the input feeder station and the output stacking station.

Mailing machines of the above type are generally known, and it is conventional in such mailing machines to dispose the various station linearly to sequentially process the mail pieces as they move along a substantially horizontal path. Such an arrangement of the processing stations increases the horizontal size of the equipment.

The present invention is therefore directed to an improved mailing machine, having a reduced footprint, as well as further advantageous features.

In accordance with one embodiment of the invention, a mailing machine is provided including a mail processing device, and a feeder for feeding mail pieces to the mail processing device. The feeder includes a support for holding a stack of substantially vertically oriented mail pieces, and holding means positioned on the support for inhibiting passage of the mail pieces to a first end thereof. Sensing means are provided for sensing the thickness in the longitudinal direction of the support of the endmost mail piece, and a separating arrangement is provided to separate the endmost mail piece, the separating arrangement being responsive to the sensing means, and affecting the release of the holding arrangement for directing the endmost mail piece to the processing device.

The support arrangement may include an inclined tray, and the holding arrangement may be comprised of a spring biased pivotally movable arm that is releasable under force of the separating device.

In a further feature of the invention, a mailing machine is provided including a mail processing device and a mail piece feeder for feeding mail pieces to the processing device. The feeder comprises a support for holding a stack of substantially vertically oriented mail pieces, and a separating arrangement is provided for separately sequentially feeding mail pieces from the support to the mail processing device. The mailing machine further includes an arrangement for sequentially feeding the mail pieces upwardly from the processing device, the processing device comprising and easel for weighing the mail pieces. A postage meter may be provided for printing indicia on the mail pieces at the easel.

In this arrangement, when a postage meter is provided at the easel, it may be a postage meter having a planer indicia die, with pressure applying means for urging a mail piece on the easel against the indicia die.

In a still further feature in accordance with the invention, a mailing machine is provided including a mail processing device, and a mail piece feeder for feeding mail pieces to the processing device. The feeder includes a support for holding a stack of substantially vertically oriented mail pieces. A separating arrangement is provided for sequentially feeding mail pieces from the support to a mail processing device. A further transport arrangement is provided for sequentially feeding the mail pieces upwardly from the processing device to an upper position, and for changing the direction of movement of the mail pieces when they reach the upper position to move in a substantially downward direction to an output stacking arrangement.

The mailing machine may further include an arrangement for moistening the flaps of envelopes, when the mail pieces are envelopes, as well as for sealing the flaps after they have been moistened. The mailing machine may further include a flat bed or ink jet postage meter, which may be located at the processing station or may be a rotary indicia printing drum positioned to mark the mail pieces with indicia as they move in a substantially downward direction toward the output stacker. In order that the invention may be more clearly understood, it will now be disclosed in greater detail with reference to the accompanied drawings, wherein:

Figure 1:
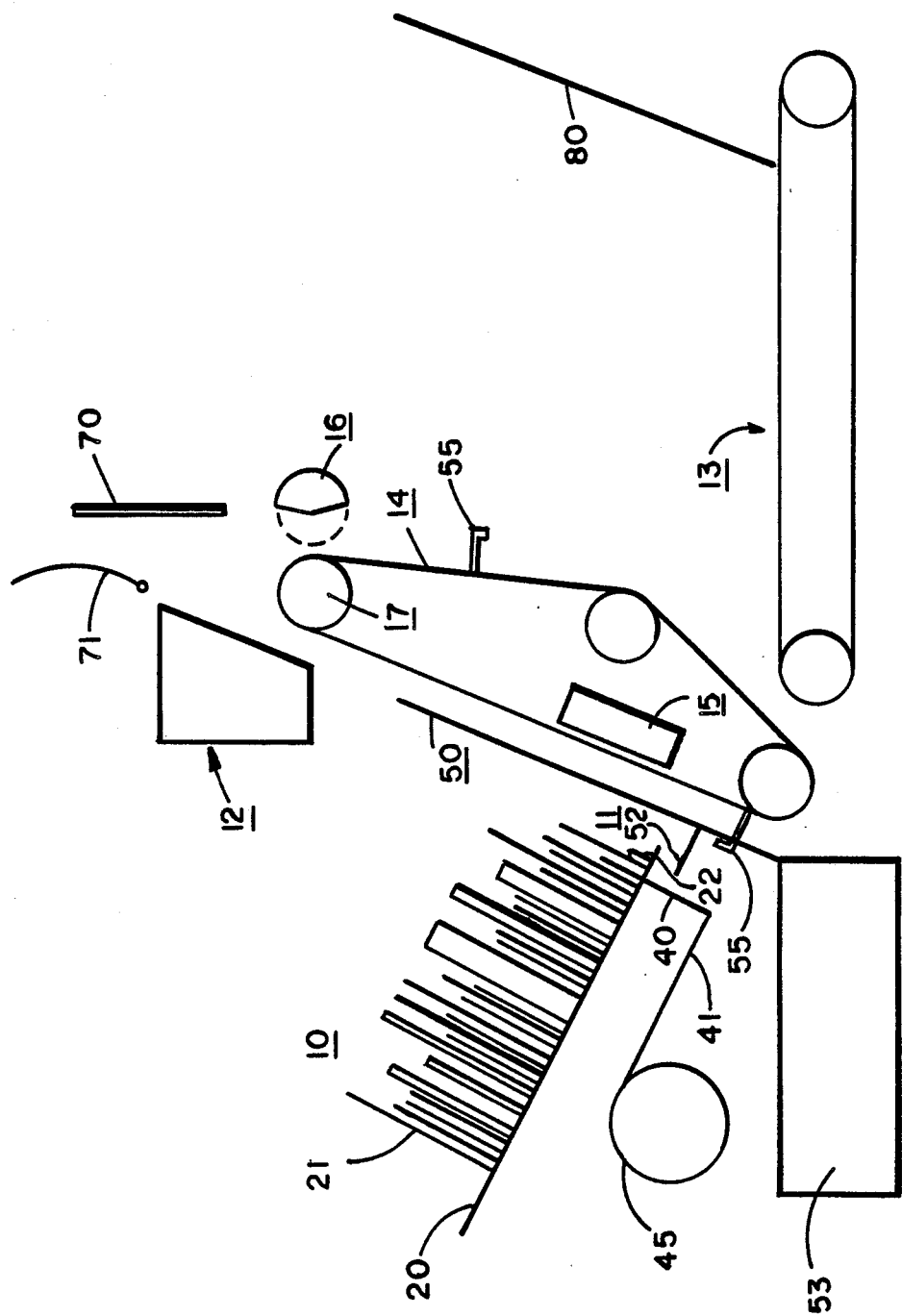
FIG. 1 is a simplified illustration of a mailing machine in accordance with the invention.
Figure 5:
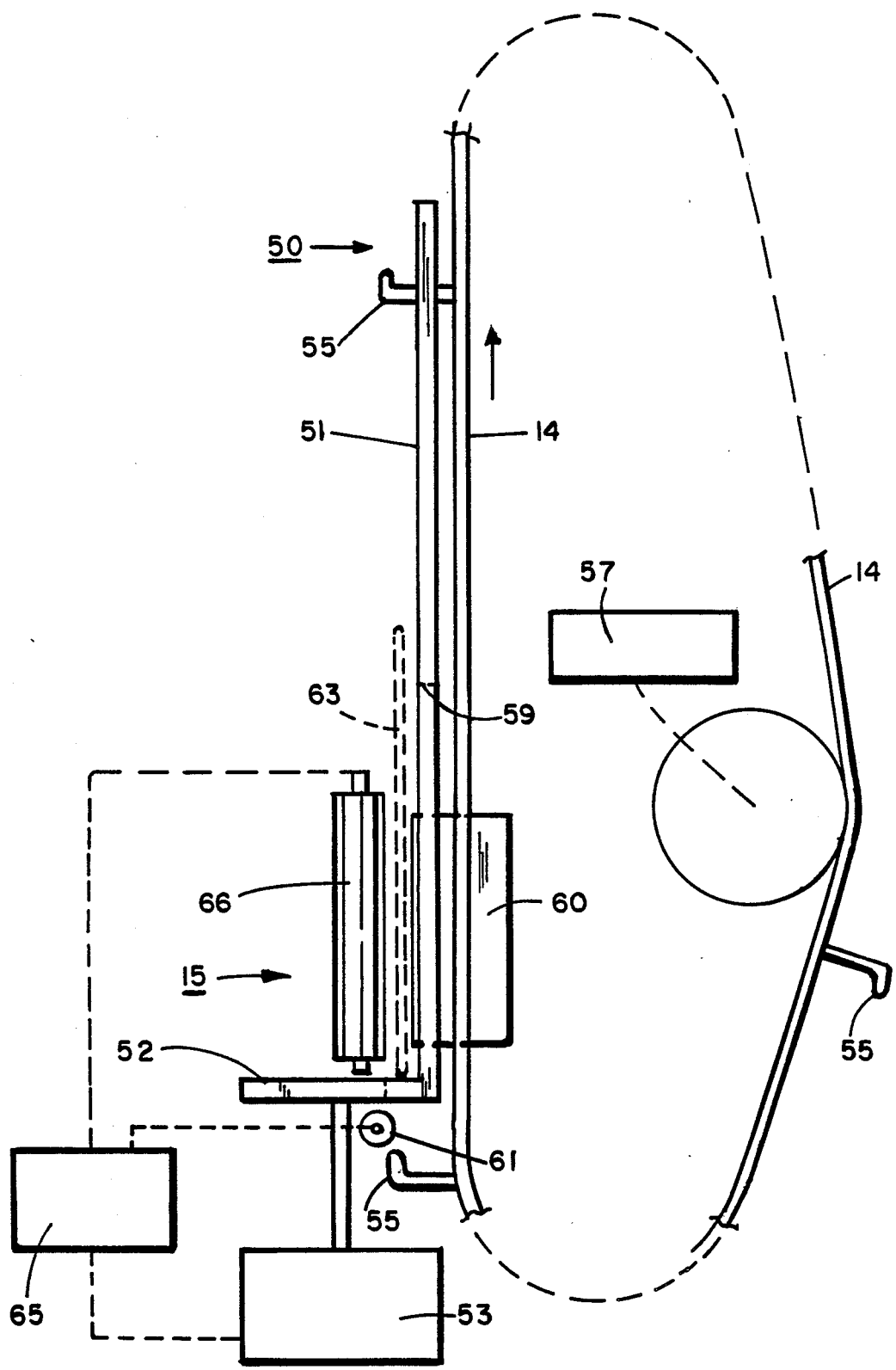
Figure 6:
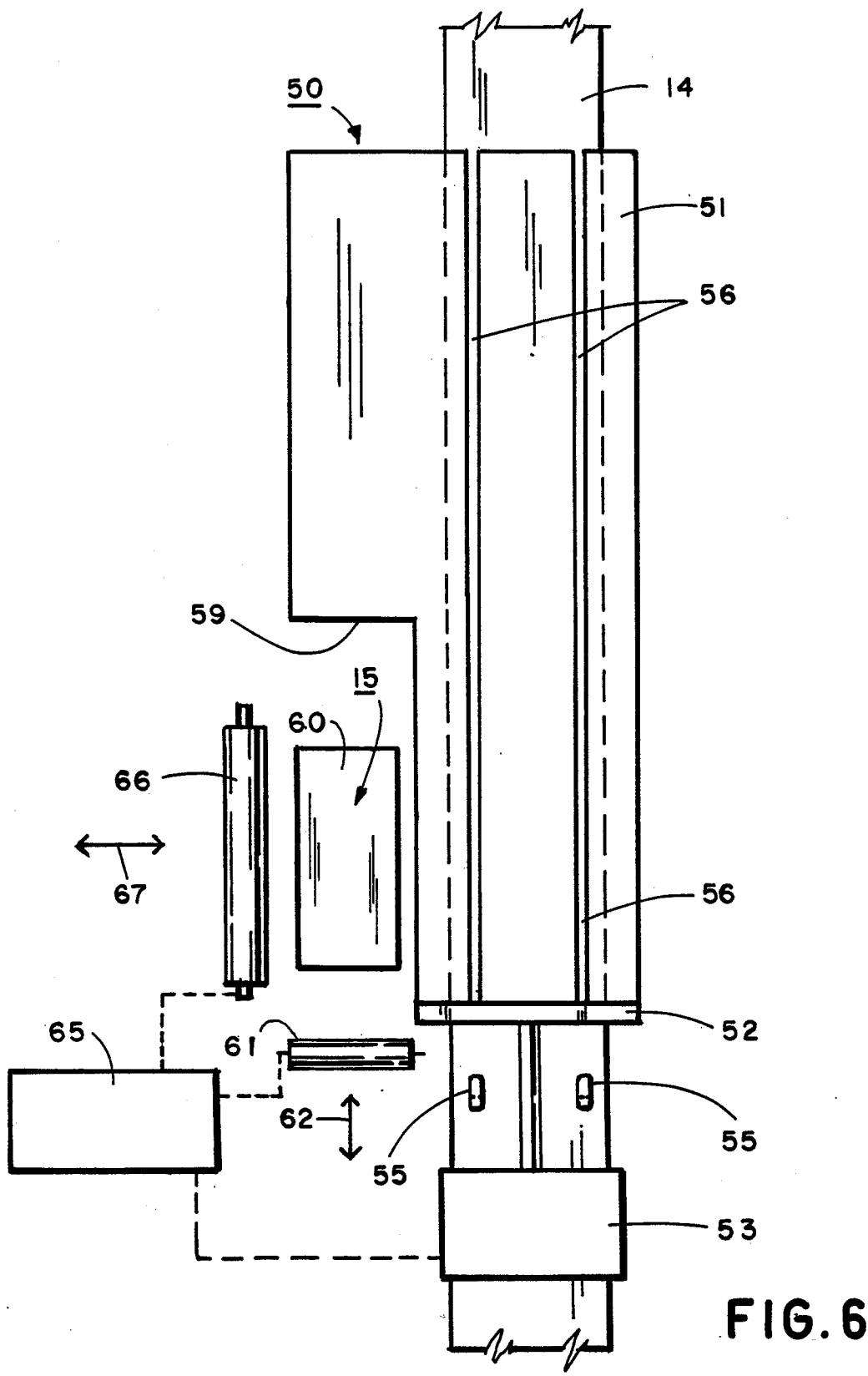

FIG. 5 is a side view of the weighing station in accordance with one embodiment of the invention; and FIG. 6 is a front view of the weighing station of FIG. 5 in accordance with the invention. Referring now to the drawings, and more in particular to FIG. 1, therein is illustrated a mailing machine comprising an input station 10, a weighing station 11, a moistening station 12 and an output station 13. A conveyor 14 is provided for conveying weighed mail pieces from the weighing station 11, through the moistener 12, and thence, after sealing as will be described, to the output station 13. A postage meter may be provided generally adjacent the weighing station, as illustrated by the reference numeral 15, or it may be located generally in the region of the roller 16. Sealing of the flaps of the envelopes may be effective at the station 12, or upon the passage of the envelopes downwardly between the nip of the rollers 16 and 17.

The input station 10 is preferably comprised of an inclined tray 20 for receiving and supporting a generally horizontal stack of vertically extending mail pieces 21. The inclination of the tray 20 is preferably sufficient to effect the downward movement of the stack by gravity, as mailing pieces are drawn therefrom. For example, the tray may be at an angle of about 15 to 45 degrees. The mail pieces need not have constant thickness, since the mailing system in accordance with the invention provides means for sensing the thickness thereof, and for their separation.

Figure 2:
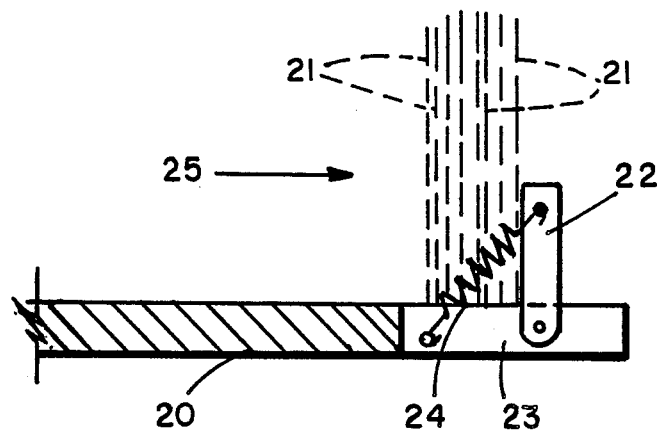
FIG. 2 is an illustrated of one arrangement for holding the horizontal input stack in the accordance with the invention.

Mail pieces are held on the tray by a spring biased arm 22 extending upwardly from the platform or tray 20 a sufficient distance to hold the stack stationary with the lowermost mail piece thereon abutting the arm 22. For example, as illustrated in FIG. 2, the arm 22 may be pivoted to the tray 22, for example in a slot 23 adjacent the end thereof, and be resiliently held substantially vertically by a spring 24. The spring has sufficient strength to hold the stack of envelopes 21 vertically, but can be depressed by force applied to the stack in the direction of the arrow 25, to lie flat to permit an envelope to pass thereover for discharge to the weighing station.

It is of course apparent that other discharge arrangements for discharging envelopes to the weighing station, either active of passive, may be alternatively employed. It is further apparent that more than one arm 22 is preferably provided for holding the mail in position.

Figure 3:
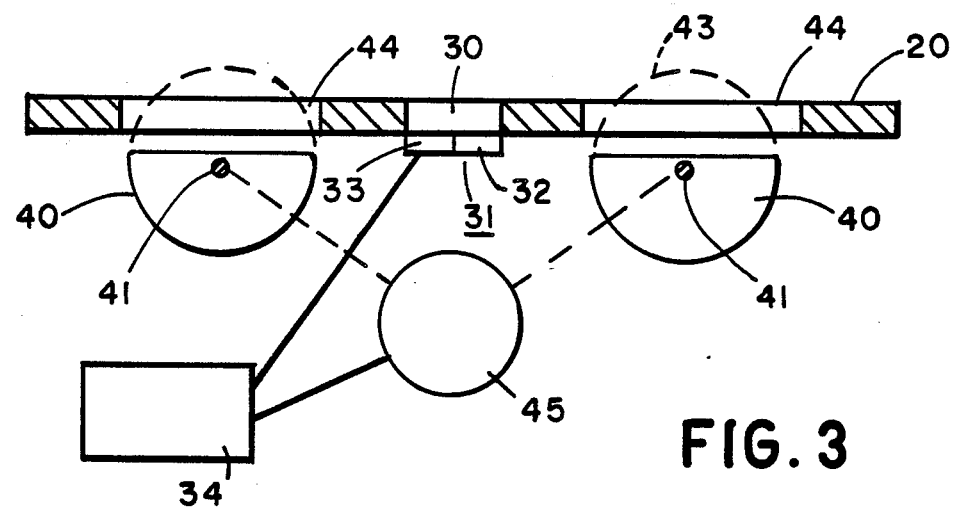
FIG. 3 is a cross sectional view through the input stack plate, illustrating the sensing of thickness of the pieces and separation thereof.

In accordance with the invention, means are provided for sensing the thickness of each envelope, and for separating the lowermost envelope on the tray physically from the remainder of the stack, for processing. In order to sense the thickness of the envelope, as illustrated in FIG. 3, a slot 30 may be provided extending longitudinally in the tray in the region of the arm 22, with the sensing arrangement 31 being directed toward the envelopes on the tray by way of the slot 30. For example, the sensing arrangement made include a light source 32 and a CCD 33 positioned to image the illuminated bottoms of the envelopes. It is of course apparent that a lens system may be employed to image the edges of the envelopes onto the active area of the CCD, for example a linear imaging system such as Selfoc produced by Nippon Glass. The output from the CCD is applied to a control circuit 34, for example a microcomputer, for determination of the next space between envelopes. The CCD and microcomputer hence sense the dark spaces between envelopes, to provide an accurate indication of the thickness of the lowermost envelope on the stack.

It is of course apparent that any other conventional technique may be employed to provide an output corresponding to the thickness of the lowermost mailing piece on the tray 20.

Figure 4:
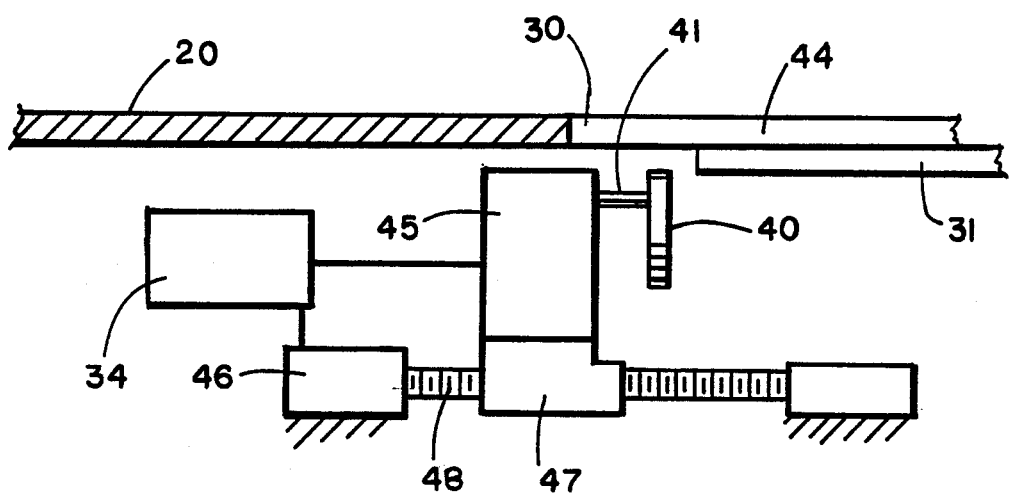
FIG. 4 is a longitudinal cross sectional view through the input stack tray, illustrating an arrangement in accordance with the invention for controlling the separator plates and for applying a longitudinal force to the end mail piece.

In the further feature of the invention, means are provided for physically separating the lowermost mail piece from the remainder of the stack. For example, as illustrated in FIGS. 3 and 4, one or more rotatable D shaped plates 40 are mounted for rotation on axes 41 extending longitudinally of an below the tray 20. The plates 40 are rotatable to the position illustrated below the tray, and to a position 43 as illustrated in dashed inlines, extending upwardly through slots 44 in the tray to separate the mail pieces. The rotational position of the plates 40 is controlled by a motor 45 under the control of the controller 34.

As illustrated in FIG. 4, the plates 40 are movable longitudinally of the tray, to be positioned in alignment with the separate lines of adjacent mailing pieces, by a motor 46 controlled by the controller 34, the motor 45 being movable with a threaded nut 47 on the threaded shaft 48 of the motor 46. It is of course apparent that alternative means may be employed for moving the plates 40 longitudinally, in accordance with conventional practice.

In addition to being movable longitudinally for alignment with the separation lines between adjacent mail pieces, the plates 40 are rotatable to extend through the slots 44 to physically separate the mail pieces. Upon such separation, the motor 46 may be further controlled to move the plates 40 downwardly along the plate, to thereby force the lower most mailing piece downwardly, thereby enabling the depressing of the resilient retaining plate 22 and the discharge of the lower most envelope from the plate.

As discussed above, the controller 34 is preferably a microcontroller programmed to synchronize the above operations of separating the adjacent mailing pieces and ejecting them on the basis of their thicknesses as sensed by the sensor 31. These operations are of course synchronized by interconnection of the microcontroller 34 with the further controlled devices of the mailing machine.

One embodiment of a weighing station in accordance with the invention is illustrated in FIGS. 5 and 6, wherein an easel 50 for receiving mailing pieces discharged from the tray 20, is comprised of an upright (slightly inclined) back 51 and a lower generally horizontal arm 52. The easel 50 is positioned to receive the mail with the side thereof laying against the back 51 and the bottom edge thereof resting on the arm 52. The arm 52 is supported on a suitable scale 53 of conventional nature, to provide an output corresponding to the weight of objects on the easel. The conveyor 14 is mounted to pass upwardly to the right hand side of the easel, the conveyor having projections 55 positioned to pass through longitudinal slots 56 through the easel, thereby engaging the bottom edges of mailing pieces on the easel and conveying them upwardly. The conveyor 14 is controlled by a controller 57, to be in synchronism with the remainder of the system.

In one embodiment of the invention, a postage meter may be provided for printing indicia on the mailing pieces at the location of the easel. In this case, the postage meter may comprise a flat bed meter having an indicia die 60 mounted in a cut out 59 in the easel, so that the die face is substantially coplanar with the left side surface of the back 51 of the easel as viewed in FIG. 5. When a mailing piece is positioned on the easel for being marked with indicia, a pressure roller 61 is movable in the direction of the arrow 62 of FIG. 6, to roll up and down across the mail piece 63 as illustrated in FIG. 5. to press the mail piece between the roller and indicia die, thereby to print the indicia on the envelope. The roller 61 is moved under the control of a microcontroller 65, controlling a conventional mechanical interface arrangement.

When a flat bed die is employed in the postage meter, it is of course apparent that the die must be inked periodically, unless self-inking dies are employed. For this purpose, as illustrated in FIG. 6, an inking roller 66 is controlled to move across the indicia die, in the absence of a mail piece thereon, in the direction of the arrow 67, under the control of the controller 65. In the arrangement of FIG. 6 it is thus shown that the pressure roller moves across the back of the mailing piece in alignment with the indicia die in one direction, whereas the inking roller 66 is moved across the indicia die in the orthogonal direction, in the absence of the mailing piece. The synchronism between the rollers is affected by the controller 65. The controller 65 may incorporate further elements of the postage meter, to enable the setting of the postage meter in accordance with the weight output from the scale 53.

The inking roller is preferably oriented in such a direction that its length corresponds to the longest direction of the indicia, in order to optimize the application of ink to the die. While the indicia die has been shown oriented in a given position, it is apparent that its location and orientation are dependent upon the orientation of the envelopes to be imprinted.

As illustrated in FIG. 1, the conveyor 14 moves the mail pieces generally vertically from the weighing station, to a moistening station 12, the mail pieces being held with their bottoms resting on projections 55 of the conveyor. In the preferred embodiment of the invention, when the mail pieces are envelopes, they are stacked on the tray 20 with their flaps facing the side away from the easel, and at the lowermost edge of the envelope. Thus, when they are raised by the conveyor 14, they will tend to project away from the conveyor adjacent the lower most edge of the envelope. The moistener may comprise a moistened brush spaced a short distance from the envelope, to brush against the flap and moistened it throughout its length. For this purpose, the projections 55 from the conveyor may be sufficiently short to hold the envelope while permitting the moistening brush to bend the flaps as necessary during the moistening thereof. Alternatively, wire fingers may be provided at the moistener station to open the flaps sufficiently for them to engage a wet under surface of the moistener, as the envelopes pass thereby. In a still further embodiment, a rotary moistening arrangement may be provided for lifting the flaps to apply water to the adhesive surface thereof. The invention is not directed specifically to the moistening technique employed, and hence any conventional moistening arrangement may be employed for this purpose. While the moistening station may also incorporate a sealing arrangement, the sealing may affected in simpler matter as will be discussed in the following paragraphs.

Referring again to FIG. 1, a wall 70 is provided above the top roller 17 of the conveyor 14, the wall 70 being positioned so that the upper edge of the mail piece will engage the wall as it is moved upwardly. The projections 55 engaging in the lower side of the mailing pieces carry the bottom of the mail pieces around the top of the roller 17, to drop into the nip between the rollers 16 and 17. As discussed above, the roller 16 may be comprised of a letter press postage meter, in the event that a postage meter is not provided at the location of the weighing easel. In this event, the timing of the downward movement must be controlled in order to ensure the entry of the mail pieces into the postage meter at the proper time, and, if necessary, the height of the mail pieces may be sensed by conventional means for example at the input feeder, in order to enable the proper timing of the feed to the postage meter. A further baffle plate 71 may be provided opposed to the wall 70 to prevent tipping of the envelope or mail piece backwardly, so that the mailing piece will be firmly sent to the nip of the rollers 16, 17.

The conveyor 14 then directs the mail pieces downwardly to the output stacker 13, which may be a conveyor, the output stacker preferably stacking the mail pieces horizontally, for example to lean against a wall 80 for removal, the wall 80 tending to move the mail pieces to upright positions.

While the invention has been disclosed and described with reference to a limited number of embodiments, it is apparent that variations and modifications that may be therein, and it is therefor intended in the following claims to cover each such variation and modification as falls within the true spirit and scope of the invention.

What is claimed is:

1. In a mailing machine including a mail processing device, and a package or envelope feeder for feeding packages to said mail processing device, the improvement wherein said envelope feeder comprises a support for holding a stack of substantially vertically oriented packages or envelopes, and further comprising means for separately sequentially feeding envelopes from said support to said mail processing device, said mailing machine further comprising means for sequentially feeding said envelopes upwardly from said processing device, said processing device comprising easel means for receiving said envelopes, and weighing means for weighing envelopes on said easel.

2. The mailing machine of claim 1 wherein said processing device further comprises a postage meter positioned to print indicia on said envelopes when they are positioned on said easel means.

3. The mailing machine of claim 2 comprising control means for setting said postage meter in response to the output of said weighing means.

4. The mailing machine of claim 2 wherein said easel means is arranged to hold the surface of said envelopes to be franked in a given plane, and said postage meter comprises a substantially planar indicia die positioned adjacent said plane.

5. The mailing machine of claim 4 wherein said postage meter further comprises pressure applying means for urging an envelope on said easel means against said indicia die.

6. The mailing machine of claim 5 wherein said pressure applying means comprises a pressure roller, and means for moving said roller in a given direction parallel to said plane against the side of said envelope o said easel means opposite said easel means.

7. The mailing machine of claim 6 wherein said postage meter further comprises an inking roller for said indicia die and movable across said indicia die in a direction parallel to said plane and perpendicular to said given direction.

8. The mailing machine of claim 1 wherein said means for moving said envelopes upwardly comprises belt means having finger means for engaging the under sides of said envelopes.

9. In a mailing machine including a mail processing device, and a package or envelope feeder for feeding packages to said mail processing device, the improvement wherein said envelope feeder comprises a support for holding a stack of substantially vertically oriented packages or envelopes, and further comprising means for separately sequentially feeding envelopes from said support to said mail processing device, said machine further comprising means for sequentially feeding said envelopes upwardly from said processing device to an upper position, means for changing the direction of movement of said envelopes when they reach said upper position, to move in a substantially downward direction, and stacking means for receiving and stacking envelopes or packages after their direction of movement has been changed, said processing device comprising easel means for receiving said envelopes, and weighing means for weighing envelopes on said easel means.

10. The mailing machine of claim 9 wherein said envelopes have flaps, and further comprising moistening means positioned to engage and moisten said flaps as said envelopes are being conveyed by said upwardly feeding means.

11. The mailing machine of claim 10 further comprising roller means positioned to seal said flaps as said envelopes move in a substantially downward direction.

12. The mailing machine of claim 9 further comprising postage meter means having a rotary indicia printing drum and positioned to mark said envelopes with indicia as they move in a substantially downward direction.

13. The mailing machine of claim 9 wherein said means for feeding said envelopes upwardly comprises belt means having finger means for engaging the undersides of said envelopes.

14. The mailing machine of claim 13 wherein said means for changing the direction of movement comprises an upper roller around which said belt means is driven, whereby said finger means engaging said undersides of said envelopes urge said envelopes to pass over said roller and be moved downwardly by a downwardly moving course of said belt means.

15. The mailing machine of claim 14 wherein said means for changing the direction of movement further comprises wall means engageable by the upper sides of said envelopes to prevent tipping of said envelopes as they pass over said upper roller.

* * * * *